May 14, 1929.   W. K. SCHOTT   1,713,096
HAND CIRCULAR SAW
Filed Feb. 14, 1927

Wilson K. Schott
INVENTOR

BY Victor J. Evans
ATTORNEY

WITNESS:

Patented May 14, 1929.

UNITED STATES PATENT OFFICE.

WILSON K. SCHOTT, OF EAST GREENVILLE, PENNSYLVANIA.

HAND CIRCULAR SAW.

Application filed February 14, 1927. Serial No. 168,098.

The present invention relates to an improved hand circular saw electrically operated and especially adapted for use in wood working generally, and more particularly in connection with casket construction, though it is possible to use the saw in cabinet making.

The invention has for its purpose to provide a comparatively simple construction of frame including a handle, with means on the frame for supporting the spindle of the saw in such wise that the spindle may engage with a chuck of a flexible shaft electrically operated, in order that the saw is free to be used around a bench at any location thereof, or around a casket, cabinet or other article of construction, for sawing small strips and grooving boards, or performing any other necessary work, essential to the article being constructed.

Another purpose is to provide a saw of this character including means adjustable relative to the frame, for gauging the relative depth of the saw, in order to groove boards, or for cutting off strips.

An essential feature of the invention is an arcuate guide operatively supported on the frame over the toothed edge of the saw, to prevent scattering of the dust as a result of making the cut.

It is to be understood that the particulars herein given are in no way limitive and that while still keeping within the scope of the invention, any desired modifications of details and proportions may be made in the construction of the device according to circumstances.

The invention comprises further features and combinations of parts to be hereinafter set forth, shown in the drawings and claimed.

Figure 1:
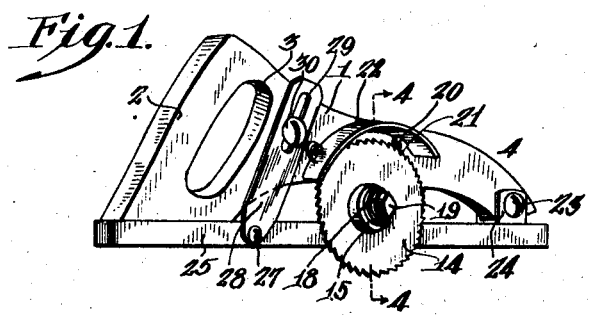
Figure 1 is a perspective view of the improved hand circular saw constructed in accordance with the invention, showing one side of the saw and its frame.
Figure 2:
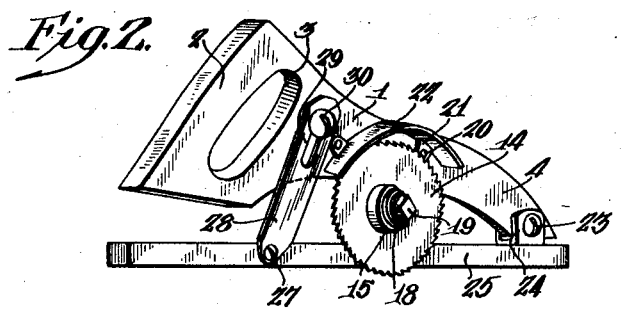
Figure 2 is a perspective view similar to Figure 1, but showing a member carried by the frame adjusted in another position in order to regulate the depth of the saw.
Figure 3:
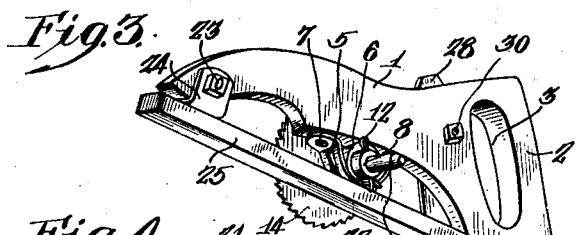
Figure 3 is a perspective view of the hand circular saw showing opposite side thereof.
Figure 4:
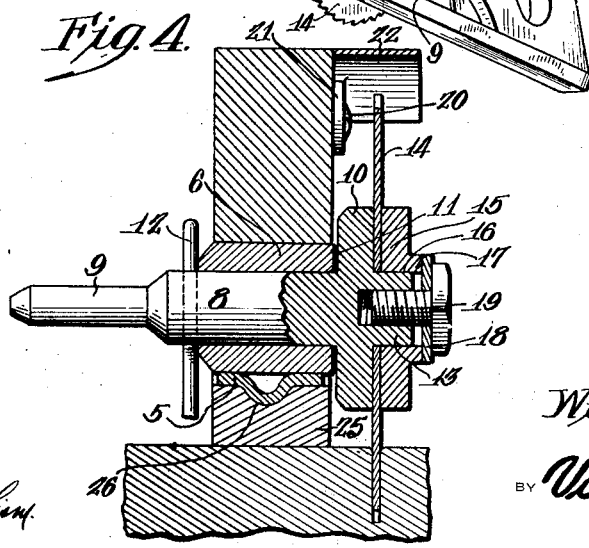
Figure 4 is a sectional view on line 4—4 of Figure 1.

Referring to the drawings—1 designates a frame which may be any size, any shape, and may be made of any material, preferably aluminum, and is provided with a handle 2 and a hand hole 3, the former to be gripped by the hand, while the latter receives the fingers of the hand.

Preferably the frame merges into a tapered forward end portion 4 which may be any desired shape, and supported on and secured to the frame, preferably to its under edge, by means of a clamp 5, is a bearing bushing 6. The clamp, though it may be any suitable construction, is U-shaped and its end portions are secured by fastening devices or screws 7 to the lower edge of the frame 1. This bearing bushing is preferably made of brass or bronze, though other metal may be used and it is secured against rotation, and receives a saw supporting spindle 8, which has a reduced shank 9 to be received in a chuck not shown of any conventional flexible type electrically operated, in order that power may be transmitted to the spindle.

The spindle opposite its shank 9 has an enlarged head 10, the shoulder 11 of which abuts one end of the bearing 6, and prevents excessive axial movement in one direction, while a cotter key 12 passing through one end of the spindle 8 prevents axial movement in the opposite direction.

One face of the head 10 a has a reduced extension 13 on which the circular saw is mounted, the saw engaging the face of the head 10. A collar 15 fits the extension 13 and and clamps against the outer face of the saw, to hold it securely against one face of the head. The opening 16 through the collar 15 has one end flanged as at 17, thereby providing means beyond the extension 13 against which a washer 18 engages. A headed screw 19 passes through the washer and into the extension 13, thereby clamping the collar 15 in position. It is obvious that by tightening up on the headed screw, which is threaded into the extension of the head 10, it is possible to clamp the saw securely in position.

By any suitable means as shown at 20 passing through ears 21 is a guard 22, which is arcuate in form and is positioned over the teeth of the saw, the purpose being to prevent scattering of the dust resulting from the sawing action of the teeth.

Pivoted at 23 is a U-shaped member or clip 24, and secured to it is a guide 25. This guide extends the length of the frame and lies normally against the under face of the clamp 5, there being a groove 26 in the guide for the reception of a rib formed in the arch of the clamp. The rear end of the guide terminates adjacent the handle of the frame, and pivoted to the guide at 27 is a strap 28. The strap consists of a metal strip, though similar means may be employed, and is provided with a slot 29, through which a tightening screw 30 passes. The screw 30 is threaded into frame of the saw.

Ordinarily the guide 25 lies against the rear end of the frame and rides upon the board or other article being cut. Obviously by loosening the screw 30 and lowering the guide, that is tiltable relatively to the frame, it is possible to gauge the depth of the circular saw 14, especially for grooving boards and the like, in making caskets and cabinets or accomplishing similar work.

The invention having been set forth, what is claimed is:

In a hand circular saw, the combination with a guide, of a frame operatively mounted on one end of the guide for swinging adjustment toward and from the guide, means for holding the frame in different adjusted positions relative to the guide, a bearing bushing associated with the frame, a saw carrying spindle journalled within the bearing bushing and having a head at one end carrying the saw, means passing through the spindle and cooperatively associated with the head to prevent axial movement of the spindle in either direction, the upper face of the guide having a groove, a clamp straddling the bearing bushing and secured to the under edge of the frame to clamp the bearing bushing in position, said clamp having a bulged rib formed on the arch of the clamp and engaging in said groove to relieve the strain, when the frame is lowered with its handle end engaged with the guide.

In testimony whereof he affixes his signature hereto.

WILSON K. SCHOTT.